July 10, 1962 K. A. BÜHRLE 3,043,203
PHOTOGRAPHIC CAMERA WITH AUTOMATIC SPEED REGULATOR
Filed Oct. 14, 1958 3 Sheets-Sheet 2

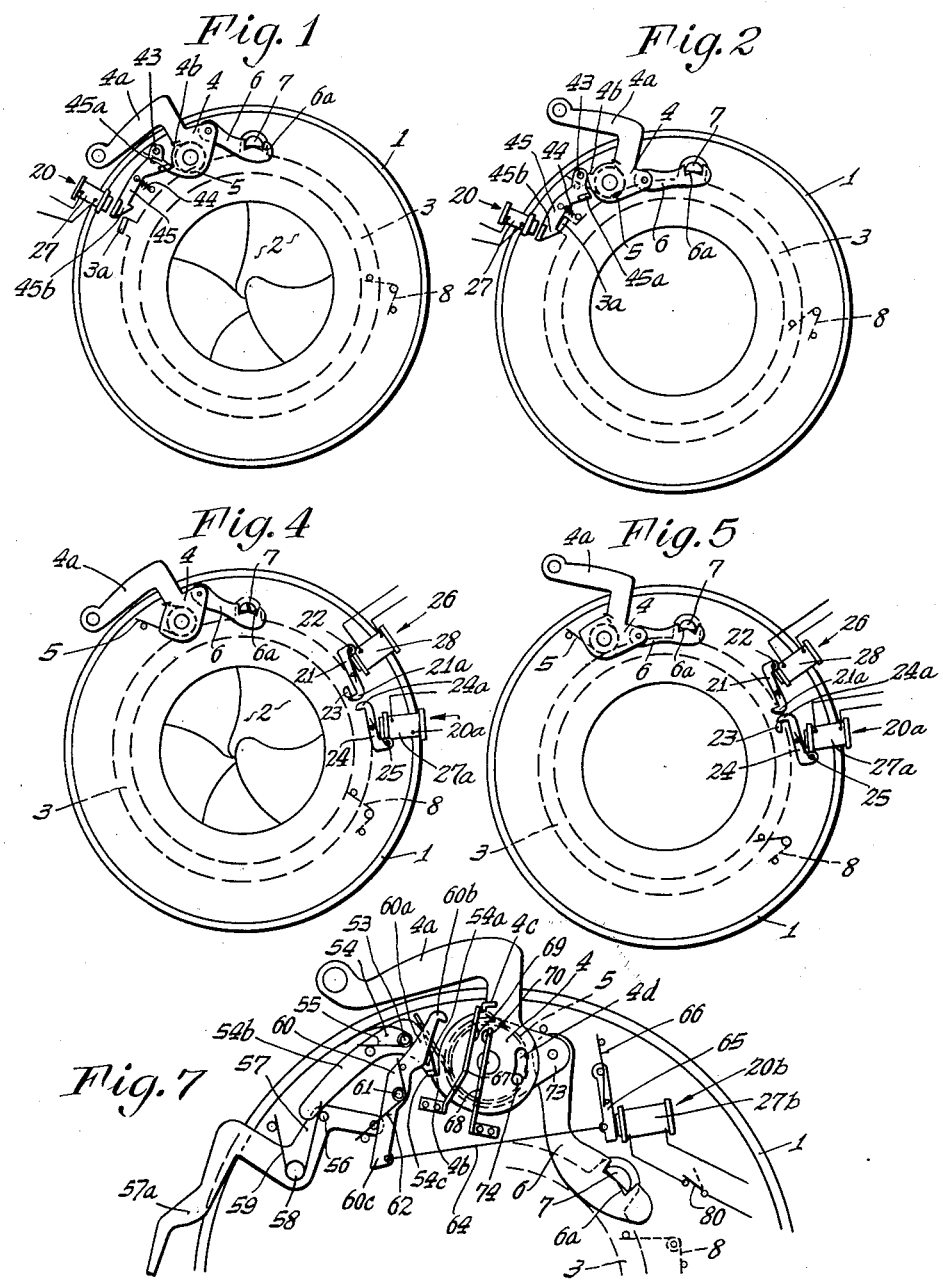

INVENTOR.
Karl Adolf Bührle

BY

Munn, Liddy, Daniels & March
ATTORNEYS

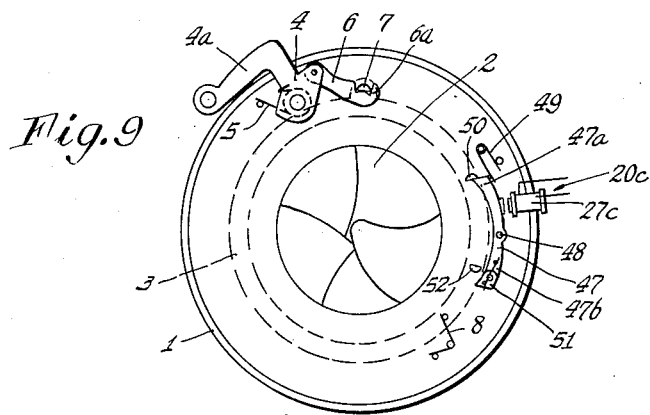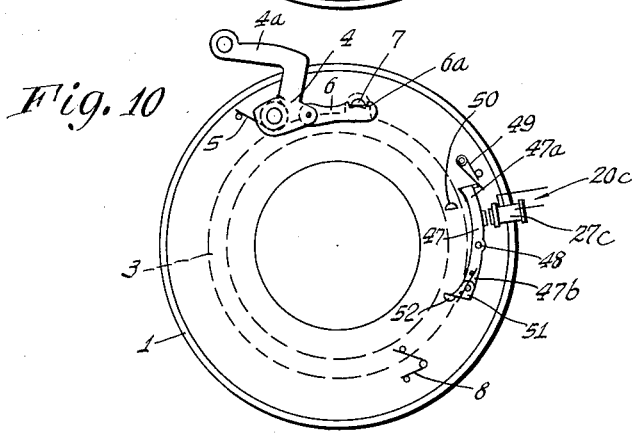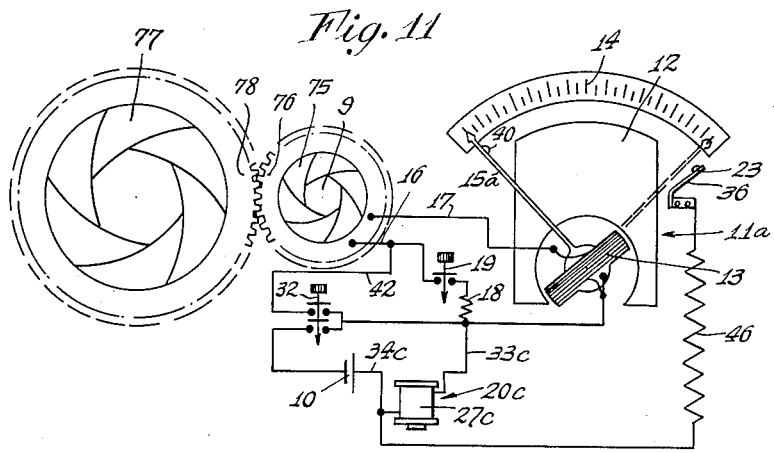

United States Patent Office 3,043,203
Patented July 10, 1962

3,043,203
PHOTOGRAPHIC CAMERA WITH AUTOMATIC
SPEED REGULATOR
Karl Adolf Bührle, Hofen (Enz), Germany, assignor to
Alfred Gauthier, G.m.b.H., Calmbach (Enz), Germany,
a corporation of Germany
Filed Oct. 14, 1958, Ser. No. 767,106
Claims priority, application Germany Oct. 18, 1957
20 Claims. (Cl. 95—10)

This invention relates to photographic cameras having automatic exposure regulators, such as shutter speed and other exposure factor regulators.

Various kinds of automatic exposure regulators or automatic setting devices which govern the shutter speed of a camera have been proposed and constructed in the past. Generally, prior devices of this type have had a number of disadvantages and deficiencies, especially with regard to the relatively great cost of manufacture involved; moreover, such devices have often been deficient in reliability of operation and accuracy.

The above disadvantages and drawbacks of these prior cameras having automatic exposure mechanisms are obviated by the present invention, and one object of the invention is to provide a positive and reliable, simple method for effecting automatic shutter speed regulation in a camera, which method consistently provides extremely uniform results with a high degree of accuracy. A further object is the provision of a novel and improved automatic regulator mechanism in a photographic camera, for carrying out the above method and securing the listed advantages thereof. Another object of the invention is to provide an improved method and mechanism as above characterized, which involves relatively little expense and manufacturing cost. Yet another object of the invention is to provide an improved method and mechanism in accordance with the foregoing, which may be used with cameras of different kinds, and which is independent of the specific structures peculiar to each camera, and which may be easily understood and adapted with relation to the existing camera structures.

The above objects are accomplished, in accordance with the invention, by a novel control or regulator mechanism which may utilize the magnitude of the current in, for example, an electric exposure regulator, or the current magnitude in an electromagnetic system energized by a photoelectric element, to determine the proper shutter speeds. Essentially the improved regulator mechanism comprises a photocell and an electromagnetic device having a movable part which is actuated either more quickly or less quickly as the photocell voltage and current are either large or small. Such electromagnetic device is constructed to be very sensitive in its response, and it is used to control the closing of the camera shutter after the latter has been first opened by the camera release. Thus, an actual response time of the electromagnetic device determines the time which the shutter is allowed to remain open. The opening of the shutter and the energization of the said electromagnetic device may be done virtually at the same time, and thus the response time of the said device, when suitably adjusted, may be utilized as an accurate timer for the shutter. The magnitude of the voltage and current from the photocell depends on the amount of light which is allowed to strike the cell. Accordingly, the light value to which the cell is subjected controls the voltage and current from the cell, which in turn control the response time of the electromagnetic device, and the latter controls the open-time of the shutter by effecting the closure thereof a certain interval after the shutter has been released and opened.

The procedure and method as provided by the invention for effecting the said automatic regulation of the shutter speed in accordance with the above explanation employs a recognized ballistic principle. This principle has been found to be especially desirable for use in a camera, being simple, reliable and accurate as employed in measuring systems utilizing the response of a magnetic device to electric currents of different magnitudes. The advantages of this ballistic principle, as regards simplicity, reliability of operation and accuracy are had to the fullest extent in connection with the present invention. Also, the procedure or method employed by the invention is distinguished by the further important advantage that the mechanism for carrying it out does not require complicated or ultra-sensitive devices, as for example mechanical stopping mechanisms or mechanical devices for tracing the position of the movable part of a measuring device energized by a photoelectric element. Instead, with the procedure as provided by the invention only a simple and straight-forward or direct acting holding device or stop is required, to hold the shutter in its open position and to thereafter release it for closing as determined by the response time of the movable part of an electromagnetic system, said response time being a function of the extent of travel of the movable part and also a function of the magnitude of the energizing current.

The invention has a further special advantage in that it is not limited to any particular specified construction or manner of operation of a camera or shutter, but instead is universally applicable to cameras of all types.

In the accompanying drawings and the following description the invention is further explained by different specific embodiments, by which the procedure or method of the invention is carried out. The special advantages of the different structures illustrated and described are further given in detail.

FIGURE 1 is a front elevational view of a photographic lens shutter with the cover plate removed, the representation being schematic. For carrying out the procedure or method of the invention, devices are provided and shown in the shutter housing for holding the shutter cocked and also for halting and holding it in its open position. The said devices are adapted to be controlled or actuated by electromagnetic systems. The shutter is shown in the cocked position.

FIG. 2 is a view like FIG. 1 but showing the shutter in its open position.

FIG. 4, showing another embodiment of the invention, is a view like FIGS. 1 and 2, wherein devices are provided for holding the shutter cocked and arresting it in its open position. The said devices may be controlled or actuated by electromagnetic systems. The arrangement and operation of the said devices are different from those shown in FIGS. 1 and 2, and the shutter is shown in its cocked position.

FIG. 5 is a view like FIG. 4, but showing the shutter in its open position.

Figure 6:
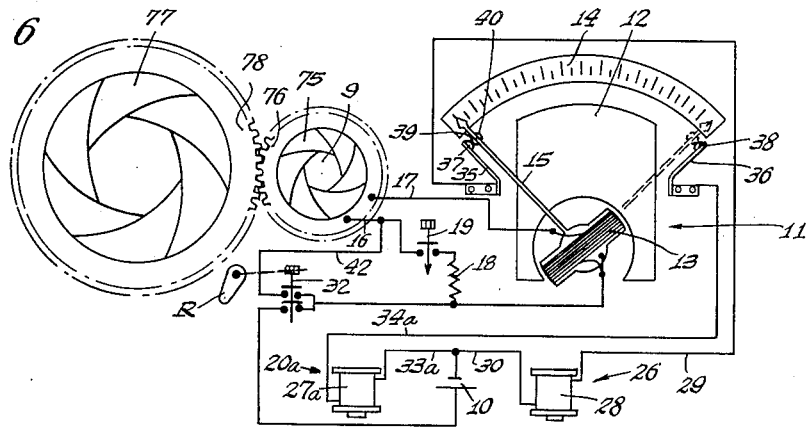

FIG. 6 is a diagrammatic representation illustrating the principle and manner of operation of an automatic regulator mechanism in accordance with the invention, employing the shutter structure shown in FIGS. 4 and 5.

FIG. 7 is a fragmentary front elevational view of a photographic lens shutter with the front cover plate removed, the shutter structure shown therein being different from that illustrated in FIGS. 1, 2, 4 and 5.

In FIG. 7 there is provided a device for releasing the cocked shutter, which device may be mechanically actuated while another device shown therein halts the released shutter in its open position. The said other device may be optionally controlled or actuated either mechanically by the camera release or else by electromagnetic systems. In FIG. 7 the shutter is shown in its cocked position.

Figure 8:
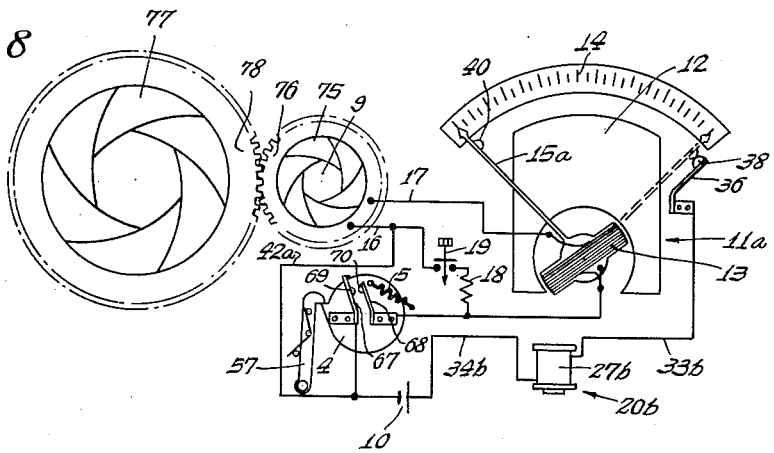

FIG. 8 is a diagrammatic representation illustrating the principle and manner of operation of the automatic regulator mechanism as provided by the invention, employing the shutter structure shown in FIG. 7.

FIG. 9, illustrating yet another embodiment of the invention, is a front elevational view in schematic form similar to the views of FIGS. 1, 2, 4, 5 and 7. In FIG. 9 there are shown devices for holding the shutter in its cocked position and for halting the shutter in its open position, the said devices being different from those of the previously listed embodiments. In FIG. 9 the shutter is shown in cocked position.

FIG. 10 is a view similar to that of FIG. 9, but showing the shutter in its open position.

FIG. 11 is a diagrammatic representation illustrating the principle and manner of operation of an automatic exposure regulator mechanism as provided by the invention, employing the shutter structures of FIGS. 9 and 10. The device represented in FIG. 11 is adapted to carry out the procedure or method as provided by the invention.

In the FIGURES 1, 2, 4, 5, 7, and 10 as shown, the housings of the photographic lens shutter are all indicated by the numeral 1. Within the housings 1 there are provided shutter blades 2, said blades being visible in FIGS. 1, 4 and 9 as shown as being closed and covering the exposure openings, whereas in FIGS. 2, 5 and 10 they are not visible since they are open and uncover the exposure openings. FIGURE 1 will now be further described, and components in FIGS. 2, 4, 5, 7, 9 and 10 which are similar will have like characters, and will function in a like manner. In FIG. 1, for the purpose of actuating the blades 2 there is provided in the well-known manner a shutter blade driving ring 3. The drive ring 3 effects the opening and closing of the shutter blades and is driven by a cocking and drive disk 4 provided with a handle 4a which is under the action of a driving spring 5. The main drive member or disk 4 and the shutter blade ring 3 are coupled to each other in the well-known manner by a driving latch 6, which is disposed adjacent the disk 4 and has a mouth or notch 6a receiving a pin 7 of semi-circular cross-section rigidly carried by the shutter blade ring 3. A spring 8 is provided for influencing or biasing the shutter ring 3 in closing direction, which is counterclockwise, said spring engaging the ring as shown. When the cocked driving disc 4 is released, it turns in a clockwise direction, causing the latch 6 to drive the shutter blade ring 3 first clockwise and then counterclockwise. By such actuation of the ring 3 the shutter blades 2 are first opened and then reclosed.

In accordance with the present invention an automatic regulation of the speed of the shutter is obtained by first releasing and opening the shutter blades 2, and then holding the said blades in their open positions for a predetermined interval of time as established by the magnitude of the voltage or current produced from a photoelectric element which is subjected to the light conditions of the subject. The release of the shutter is effected by release of the cocked driving disk 4, and at this time the current produced by a photoelectric element 9 (FIG. 3) by its magnitude (which is a function of the light striking the surface of the element) controls the exposure time through energization of an electromagnetic system comprising a moving coil type electrical measuring instrument indicated generally by the numeral 11 and hereinafter also termed a first electromagnetic system. Such system by its response releases for closing the shutter blades which have been opened, and there is thus utilized the time required by a movable part of the electromagnetic system 11 to travel a path of predetermined length, such travel time being a function of the said length and also of the magnitude of the energizing current.

In accordance with the method as provided by the invention there is also a special advantage, in that devices for carrying out the method may be constructed in a surprisingly simple and economical manner. In accordance with the invention, a device may be so arranged that it holds or arrests the released shutter in its fully open position through the use of a simple and effective locking or holding part, the said holding part cooperating with a stop means carried by one portion of the shutter drive mechanism, as for example by the master driving member 4 or by the shutter blade driving ring 3. Such holding part is mounted to be movable to a releasing position, wherein the shutter is allowed to reclose, in response to the movable part of the electromagnetic system reaching the end of its path of travel.

A locking or holding part of the above type, which for example may be constituted as a latch or lever, can be easily produced at little cost; in addition, it can be simply arranged in any camera or shutter structure. By such organization advantage may be taken of the fact that in camera or shutter structures the "B" mechanism, which serves for obtaining speeds that do not run automatically, utilizes a locking part or means which functions to hold the shutter in its open position. In these "B" mechanisms there is provided a locking part which may be readily utilized for the purposes of the present invention, said part operating to halt the shutter in its open position after the actuation of the shutter release. Due to the fact that virtually without exception all well-known cameras have "B" mechanisms, such cameras inherently contain shutter mechanisms which are adaptable to the procedure or method as provided by the invention, without any major changes in their principle of operation. From the foregoing it will now be understood that the present invention may be of considerable importance and have a wide field of application.

Figure 3:
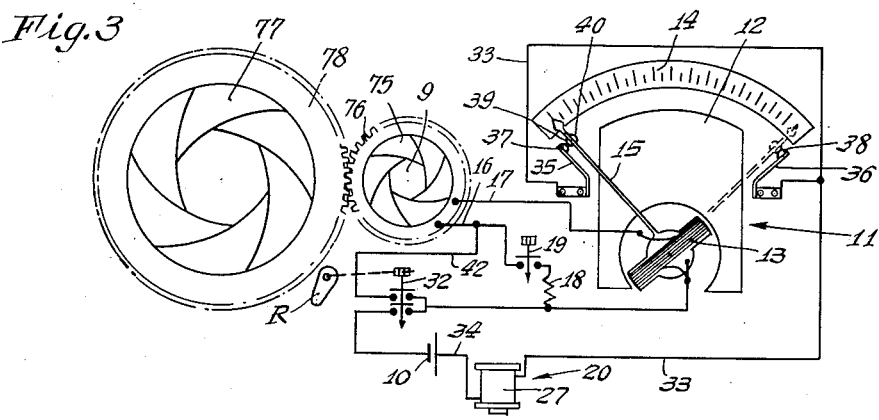
FIG. 3 is a diagrammatic representation illustrating the principle and mode of operation of an automatic regulator device as provided by the invention, using the shutter structures shown in FIGS. 1 and 2.

In the illustrated embodiment of the invention of FIGS. 1–3 the locking part or means which keeps the shutter in its open position is released by the movable part of a second electromagnetic system comprising an electromagnet 20 which is energized from a separate source of current, e.g. a battery 10. In the circuit of the second electromagnetic system 20 a contact switch is arranged, which is adapted to be actuated and closed at the end of the movement of the movable part of the first electromagnetic system as the said part completes its traversal of the predetermined path of movement arranged for it.

By the provision of the special or separate electromagnetic system which actuates the locking part that holds the shutter in its open position there is the great advantage that the first electromagnetic system 11 which is energized from the photocell may be of light or delicate construction and may have great sensitivity and accuracy, even with low input power. Accordingly, an instrument-movement type of magnetic system may be utilized for this purpose readily, inasmuch as a satisfactory control function requiring but little power may be had from such a unit. Because of these considerations the first electromagnetic system may be readily constituted, as mentioned above and illustrated in the embodiment of FIGS. 1–3 of the invention, as a moving-coil type of measuring device or instrument movement 11. The moving coil 13 of such instrument is subjected to the flux of the permanent magnet 12, and may be provided with an indicating pointer 15 adapted to cooperate with a speed scale 14 which is fixedly mounted on the camera structure. Electrical connections, including the leads 16, 17 are provided between the moving coil 13 of the measuring device and the photo-element 9. In the lead 16 there may be further provided a calibrating resistance 18 and also a contact switch 19 adapted to be manually operated for closing the circuit through the coil 13.

The sensitive instrument movement or first electromagnetic system 11 as above set forth has the special advantage that it may be used not only to control the second electromagnetic system 20 but also used as a shutter speed indicator device, made operative by closing the manually-operative switch 19. Such indicator device will then reveal to the operator, before the shutter is actuated, whether or not there is sufficient light, in view of the various other exposure factors involved, to take a picture and also whether or not the speed expected will be suitable for the particular object which is to be photographed.

In the embodiments of the invention illustrated in FIGS. 1–3 the cocked shutter is released electrically. This manner of releasing the shutter has the advantage that only a small amount of initiating mechanical effort is required to effect the release, and accordingly there is virtually eliminated any danger of inadvertently shifting the camera and "jumping" the picture when the operator actuates the shutter release.

For the purpose of holding the shutter in its cocked position there is provided a locking part which cooperates with a stop means carried by a portion of the shutter drive mechanism. FIGURES 1–3 illustrate a simple embodiment of the invention for carrying out the procedure and method thereof. In this illustrated embodiment the locking part which holds the shutter in its position and which cooperates with a stop means arranged at a part of drive mechanism, can be released by the movable part or armature of the second electromagnetic system 20. For the purpose of energizing the said system 20 a contact switch may be arranged in its circuit, for actuation either directly or indirectly by the camera release "R."

This embodiment of the invention is characterized by the employment of relatively few parts, and by a desirable compactness whereby there is effected an appreciable saving of space. This is achieved by effecting the release of the locking part for the means which holds the shutter in its cocked position, and by effecting the release of the locking part which holds the shutter in its arrested open position, by one and the same electromagnetic system, viz. the system 20. In such case, a third electromagnetic system, as will be later described and as is incorporated in the embodiment of the invention illustrated in FIGS. 4–6, is omitted.

The second electromagnetic system 20 may be controlled in different ways. One advantageous control, for example, is obtained by providing in the circuit of the said system 20 a contact switch which is actuated in response to movement of the coil 13 of the first electromagnetic system 11. When the coil 13 and the pointer 15 attached thereto are in the starting position as shown in FIG. 3, for example, the said switch in the second system 20 is closed; in all other positions of the coil 13 and pointer 15 the switch is open. There is also provided an additional contact switch in the circuit of the magnetic system 20, said switch being closed when the movable coil 13 and pointer 15 reach the end of their movement, the pointer occupying the position indicated by the broken outlines in FIGURE 3 for example.

FIGURE 3 illustrates the above contact switches arranged in the manner outlined. Regarding the construction and manner of operation of the device shown in FIG. 3, these are very similar to that described below in connection with FIGS. 4–6. However, there is some difference, which will be explained later. Suffice to say here that in the arrangement of FIG. 3 both of the contact switches comprising the contacts 37, 39 and 38, 40 are actuated by the same movable part comprising the coil 13 and pointer 15 of the first electromagnetic system 11, both said switches being arranged in the circuit of the second electromagnetic system 20.

It will be understood, considering FIGS. 1 and 2, that the movable part of the electromagnetic system 20 is included in a locking means comprising a locking lever 45 which is supported by a fixed spindle 43 and is biased in a counterclockwise direction by an extension coil spring 44. The locking lever 45 cooperates with two different parts of the shutter drive mechanism in this illustrated embodiment of the invention, these parts being illustrated by the cocking and driving disk 4 on the one hand and by the shutter blade ring 3 on the other hand. With such organization, the disk 4 may be held in its cocking position by the lever 45 and also the shutter blade ring 3 may be held in its halted position to maintain the shutter blades 2 open, by the same lever 45. In accomplishing the above action, the lever 45 is provided with a bent lug 45a, constituting a further part of the said locking means, and with a nose or hook 45b. The lug 45a is adapted to be cooperable with a projection 4b provided on the disk 4 and constituting a part of a stop means of the driving mechanism, and the nose 45b is cooperable with a lug 3a constituting another part of the stop means on the driving mechanism, which lug is bent and projects from the shutter blade ring 3. It will now be understood that the lever 45 and the nose 45b thereof also constitute a locking means different from the abovementioned locking means constituted of the lever 45 and lug 45a. The manner of operation of the device is well illustrated in FIGS. 1 and 2.

By the use of but the single lever 45 for keeping the shutter in its cocked position and also for halting the shutter in its open position a minimum number of parts is required. In addition, the cooperable relationship between the lever 45 and the two different parts 4 and 3 of the shutter drive mechanism, in accordance with the invention, is of advantage in that only a small amount of movement is required of the lever to effect its two releasing functions. In conjunction with the manner of operation of the contact switches associated with the pointer 15 for controlling the second electromagnetic system 20, the short stroke or movement of the lever 45 is favorable when it is desired to obtain the faster shutter speeds involved with keeping the shutter open for smaller intervals of time. For, immediately after release of the cocked shutter by the lever 45, the latter may be again in its arresting position, in readiness for engagement with the lug 3a of the shutter ring 3. The above action is made possible to a great extent by the relatively short stroke or travel of the lever 45, which permits arrest of the ring 3 very quickly after the release of the cocked shutter.

In summarizing, the manner of operation of the device as above described, is as follows:

In FIG. 1 the shutter is shown in its cocked position wherein the cocking and driving disk 4 is held captive by virtue of engagement of the nose 4b thereof with the lug 45a of the lever 45. The magnetic coil 27 of the second electromagnetic system 20 is de-energized. If now the camera release "R" is actuated, the function of the contact switch arrangement associated with the pointer 15 as shown in FIG. 3, begins. Such function is similar to that of the contact switch arrangement of FIG. 6 which is to be described below. First, the magnetic coil 27 is energized, attracting the lever 45 against the action of the spring 44. The lever 45 thereby releases the driving disk 4, so that the shutter blades will be opened under the action of the driving spring 5. Immediately after the cocking disk 4 has been released, the magnetic coil 27 is de-energized by virtue of the initial movement of the pointer 15. In response to this, the lever 45 is returned to its starting position under the action of the spring 44. The opening time of the shutter is such that the lever 45 returns to such starting position prior to the shutter blades 2 reaching their open positions.

Shortly before the shutter blades 2 reach their open positions the returned lever 45 will be somewhat lifted by the lug 3a of the shutter blade ring 3, against the action of the return spring 44, and as the shutter blades 2 reach their fully opened positions the nose 45b of the lever 45 will drop behind the lug 3a of the shutter blade ring 3 as shown in FIG. 2. Thus, the shutter blades 2 will be kept in their open positions while the pointer 15 traverses its path of movement from the leftmost position shown in full lines in FIG. 3 to the right-most position shown by the dotted outline in this figure. Upon the pointer 15 reaching such rightmost position the contact switch 38, 40 will be closed, energizing the magnetic coil 27 again. Such renewed energization of the magnetic coil will now cause the lever 45 to be again attracted against the action of the return spring 44, whereupon the clockwise movement of the lever will release the shutter blade ring 3 and enable the latter to close the shutter blades 2.

It will be understood that the windings of the moving coil 13 are of insulated construction, being provided on a suitable carrier or spool which may be in the form of a rectangular frame. In a well-known manner, the leads from the coil 13 may be brought out for connection to the external circuit, as by the use of suitable spiral coil springs not shown, and an additional connection may be established with the pointer 15 by a similar expedient, the said pointer being thereby constituted of electrically conductive material.

Another embodiment of the invention is illustrated in FIGS. 4–6 which has a first electromagnetic system 11 as already described and wherein a locking part which holds the shutter in its cocked position is constituted as a lever 21. Such lever is pivotally carried by a spindle 22 and has a nose or hook 21a at its free end, for cooperation with a pin 23 which is fixedly mounted on the shutter blade ring 3 as clearly seen in FIG. 4. The lever 21 is under spring action, being biased in a clockwise direction as viewed in this figure.

The pin 23 carried by the shutter blade ring 3 also serves an additional function, in holding the released shutter in its open position. To effect this there is provided another locking part, arranged to be cooperable with the pin 23, said other locking part being also under spring action and being controlled by another second electromagnetic system comprising an electromagnet 20a similar to the electromagnet 20. The said other locking part is constituted as a lever 24 having virtually the same shape as the lever 21. The lever 24 is carried by the spindle 25, and its nose or hook portion is indicated at 24a.

For effecting release of the locking lever 21 there is provided which I now call a third electromagnetic system comprising an electromagnet 26, which is also connected to the current source 10 provided for the second electromagnetic system 20a. Both the said second and third electromagnetic systems 20a and 26 comprise individual, fixedly mounted magnet coils indicated respectively by the numerals 27a and 28, and the movable parts or armatures of these systems are constituted respectively as the locking levers 24 and 21 described above, thereby to achieve a desirable simplicity of structure and function, and a saving in manufacturing cost.

The structure as set forth above is seen to be simple, straightforward and direct-acting, defining a flexible arrangement which is readily attachable to existing shutter structures and detachable therefrom; it also is extremely reliable in its operation, even though the act of releasing the halted, open shutter follows quickly after the initial release of the cocked shutter. This reliable operation is due to the fact that the release of the cocked shutter and the release of the halted open shutter are effected by two different and separate, compact devices. It will be noted that at the time the shutter is in its cocked position the lever 24 which releases the shutter from its open position is already in position to act (FIG. 4).

In FIGURE 6 of the drawings there is illustrated schematically the circuit of the third electromagnetic system 26 which is supplied with energy from the battery 10 that is provided for the second electromagnetic system 20a. The wire leads for the electromagnetic system 26 are indicated by the numerals 29 and 30 in FIG. 6. In this circuit a contact switch 32 is provided and said switch being normally open. In order to close the circuit for the purpose of rendering the system operative, the contact switch 32 may be actuated either directly or indirectly by the camera release "R" (shown schematically). Also, in the circuit of the third electromagnetic system 26 an additional contact switch, comprising contacts 37 and 39, is provided, said switch being under the control of the movable part 15 of the first electromagnetic system. The switch comprising the contacts 37, 39 is closed when the moving coil 13 is unenergized or in its starting position; however, for all other positions of the moving coil 13 and of the movable part or pointer 15 the switch comprising the contacts 37 and 39 is in open position. Such switch may advantageously be constituted by mounting the contact 37 on a fixed support 35, and by mounting the contact 39 near the extremity of the pointer 15 of the moving coil 13.

As already mentioned above, the circuit of the second electromagnetic system 20a includes a contact switch which is also under the control of the movable part 15 of the first electromagnetic system whereby the switch is open at all times except when the said movable part is at the extreme end of its path of travel, as effected by energization of the movable coil 13. The said position of the movable part or pointer 15 at the end of its path of travel is indicated by the broken lines in FIG. 6. The magnetic coil 27a of the second electromagnetic system 20a is energized through the leads 33a and 34a as shown.

In the embodiment of the invention illustrated in FIGS. 4–6 the contact switch in the circuit of the second electromagnetic system 20a may comprise a contact 38 mounted on a fixed support 36, and a movable contact 40 which is carried by the pointer 15 and is cooperable with the fixed contact 38.

The above described arrangement of the various parts, and the cooperation of the same result in the following function:

When the contact switch 32 is actuated, as by operation of the shutter release "R," the circuit through the third electromagnetic system 26 is closed, together with the circuit for the first electromagnetic system 11 supplied with current through the wires 17 and 42 from the cell 9. Closing of the circuit for the third electromagnetic system 26 results in energization of the magnet 28 thereof, in response to which the armature lever 21 associated with such magnet is shifted in a counterclockwise direction, thereby effecting the release of the shutter. However, at the same time that the coil 28 is energized, the closing of the circuit through the magnetic system 11 effects an energization of the movable coil 13 thereof, and such coil is now caused to turn in a clockwise direction as viewed in FIG. 6. At the beginning of the movement of the coil 13 the contact switch comprising the contacts 37, 39 opens, thereby de-energizing the third electromagnetic system 26 and removing the load from the battery 10.

The release of the shutter by the armature 21 enables the driving mechanism comprising the disk 4 to actuate the shutter to its open position. The accompanying clockwise turning movement of the shutter ring 3 will bring the pin 23 thereof past the nose or hook 24a of the latching lever 24 and the latter will now engage the said pin 23 and prevent the counterclockwise return of the shutter ring 3 which is necessary to again close the shutter blades 2. The shutter is thus now held in its open position, and meanwhile the pointer 15 of the first electromagnetic system 11 is moving in a clockwise direction from its leftmost position as indicated by the full lines in FIG. 6 to its rightmost position as indicated by the broken outline in this figure. The path of movement of the pointer 15 is thus a constant quantity, and the speed of movement of the pointer depends on the magnitude of the current which energizes the coil 13. When the pointer 15 reaches the end of its path of travel the contact 40 thereof will engage the fixed contact 38 and this will close the circuit for the second electromagnetic system 20a. Upon this occurring the coil 27a thereof is energized, and such energization actuates the lever or armature 24, shifting the latter in a clockwise direction from the position shown in FIG. 5.

It will be observed that in this figure the armature 24 is holding captive the pin 23 carried by the shutter ring 3, preventing counterclockwise return movement of the shutter ring and closing of the shutter blades. Upon the coil 27a being energized in consequence of the pointer 15 reaching the end of its movement, the armature lever 24 will be attracted and shifted clockwise, now releasing the pin 23 whereby the shutter ring 3 is free for counterclockwise turning movement under the action of the driving disk 4, thereby to again close the shutter blades 2.

When the camera release "R" is let go of by the operator, the switch 32 moves to its open circuit position. In consequence of this, the first and also the second electromagnetic systems are de-energized whereupon the moving coil 13 of the first system will return to the starting position indicated by the full lines in FIG. 6, under the action of the spring which is not shown for reasons of clarity of illustration. Also, the lever 24 will return under spring action to the position shown in FIGS. 4 and 5, in readiness for a subsequent engagement with the pin 23 when another exposure is made.

By the above arrangement of contact switches there is the important advantage that the requirements of current for both the second and third electromagnetic systems 20a and 26 are very low. This is due to the fact that, on the one hand, at the moment that the camera release "R" is actuated the ensuing interval during which the switch contacts 37, 39 remain closed is extremely short, this being the interval consumed by the pointer 15 in leaving its leftmost position as seen in FIG. 6. Thus, the energization of the third electromagnetic system 26 is only for a brief moment. On the other hand, the energization of the second electromagnetic system 20a is also for only a brief moment, since upon the pointer 15 closing the switch constituted of the contacts 38, 40 the shutter will be released for closing and the operator having let go of the shutter release "R" will by such act de-energize the coil 13 whereby the contacts 38, 40 are again immediately separated.

Another embodiment of the invention is shown in FIGS. 9–11. FIGURE 11 illustrates, in conjunction with FIGS. 9 and 10, a different control arrangement involving a first electromagnetic system 11a and another second electromagnetic system 20c. With this different control arrangement there is provided in parallel with the second electromagnetic system 20c a shunt in the form of a resistance 46, which may be switched into the circuit by the contact switch 38, 40 actuated by the pointer 15 of the first electromagnetic system 11a as the said pointer reaches the end of its path of movement. The introducing of the shunt resistance 46 in the circuit effects a reduction in the magnitude of the current which flows in the second electromagnetic system 20c, thereby having the effect of de-energizing the coil 27c thereof and rendering the said system inoperative. This causes a release of the movable part of the system 20c as will be understood.

With the organization as above set forth the movable part of the second electromagnetic system 20c is constituted as a two-armed lever 47, in FIGS. 9 and 10. The lever 47 is supported in the shutter housing by a spindle 48, and is biased in a counterclockwise direction by a spring 49. For the purpose of keeping the shutter in its cocked position, the spring 49 maintains engagement between an arm 47a of the lever 47 and a pin 50 which is fixed on the shutter blade ring 3 (FIGS. 9 and 10). For the purpose of holding the shutter in its arrested, open position the other arm 47b of the two-armed lever is utilized, said other arm having a turnably mounted latch 51 which is influenced by a spring and arranged to cooperate with an additional pin 52 fixedly carried by the shutter blade ring 3. By the releasing or clockwise movement of the lever 47 the latch 51 is disposed in the path of movement of the pin 52 as the shutter blade ring 3 turns clockwise. The latch 51, however, permits the pin 52 to bypass it, resulting in the shutter blades 2 becoming fully opened. However, the latch 51 prevents the return or counterclockwise movement of the shutter blade ring 3, thereby preventing closing of the shutter blades 2 (FIG. 10).

Instead of the latch 51 being carried by the lever 47, it may be arranged on the shutter blade ring 3. Or, the latch 51 may be dispensed with entirely if the arm 47b of the lever 47 is made to be resilient, so that it may yield to permit the bypassing of the pin 52.

The mode of operation of the device of FIGS. 9–11 as above described is as follows:

When the camera release is actuated, the second electromagnetic system 20c and the first electromagnetic system 11a are energized. Energization of the moving coil 13 will cause it to commence its clockwise travel and at the same time a movable part of the second electromagnetic system 20c, viz. the locking lever 47, will be attracted by the energized magnetic coil 27c, thus releasing the cocked shutter. With such movement of the lever 47 the latch 51 carried by the lever arm 47b will be brought into its operative or locking position. As the shifted blade ring 3 turns clockwise in opening the shutter blades 2 the latch 51 will be somewhat lifted against the action of the spring by the pin 52 which bypasses the latch; thereafter the latch 51 will drop behind the pin 52, preventing the shutter ring 3 from returning in a counterclockwise direction and maintaining the shutter blades 2 in their open positions. This will continue until the pointer 15 reaches the right end of its movement, whereupon the contact 40 thereof will engage the fixed contact 38. When this occurs, the shunt resistor 46 in the second electromagnetic system 20c will be placed in parallel with the magnetic coil 27, robbing the latter of much of its current whereby the lever 47 will be released under the action of its spring 49. As a result, the latch 51 will become disengaged from the pin 52, permitting the shutter blade ring 3 to return in a counterclockwise direction to the position of FIG. 9, effecting a closing of the shutter blades 2.

An important advantage of the device illustrated in FIGS. 9, 10 and 11 resides in the fact that the second electromagnetic system 20c requires only a single contact switch which is to be controlled by the pointer 15a or movable part of the first electromagnetic system 11a. This represents a saving in parts, and provides an easily adjusted arrangement for carrying out the procedure and method as provided by the invention. With regard to the speed of operation of the lever 47 and the adaptability of the device to existing camera structures, the arrangement shown in FIGS. 9, 10 and 11 has advantages which are similar to the arrangement of FIGS. 4–6. As will be understood from an inspection of FIGS. 9 and 10 and a perusal of the explanation above given, it is necessary in accordance with the invention to utilize a part of the shutter drive mechanism, as for example the shutter blade ring 3, which is reciprocatively movable to effect the opening and closing of the shutter blades as required for an exposure.

Due to the manner of operation of the devices described above for carrying out the procedure and method as provided by the invention it is essential to relate the energization of the first electromagnetic system 11 to the energization of the second and third electromagnetic systems 20a, 26 in an accurate and reliable manner. This can be accomplished advantageously, in a camera structure, by effecting the energization of the first electromagnetic system 11 by a switching device which is responsive to the closing of the contact switches which are directly or indirectly actuated by the camera release and which switches are arranged in the circuits of the second and third electromagnetic systems 20a, 26.

In the embodiments of the invention illustrated in FIGS. 1–3, 4–6, and 9–11 the contact switches for the second and third electromagnetic systems 20, 20a, 20c and 26, as well as the switch device for the first electromagnetic systems 11 and 11a are combined in the single type of switching device 32. In order that this switch 32 may be actuated with the expenditure of only very little mechanical force, it may be advantageously provided with a suitable well known leverage type operator. Such switches are commonly known in the trade as "microswitches."

Another embodiment of the invention for carrying out the procedure or method in accordance with the invention, to effect automatic exposure regulation in photographic cameras is illustrated in FIGS. 7 and 8. The device shown in these figures is likewise characterized by a locking part which is arranged to keep the shutter in its cocked position. The said locking part cooperates with a stop means arranged at a part of the shutter drive mechanism, and is also mechanically connected with the camera release. In the circuit of the first electromagnetic system 11a there is provided a contact switch arranged to be actuated in response to movement of a part of the shutter drive mechanism, said switch being in open position when the shutter is held cocked, and being closed immediately upon the start of movement of the shutter drive mechanism. The arrangement is also characterized by the provision of the control switch 38, 40 in the circuit of a second electromagnetic system 20b, said control switch being closed by the movable part 15 of the first electromagnetic system 11a as the said part reaches the end of its path of movement.

Such construction is especially economical to fabricate, since the release of the cocked shutter may be effected in a mechanical fashion, by a well known shutter release device. Thus, it is necessary to have only a special part for the locking means which holds the shutter arrested in its open position. Moreover, further reductions in cost may be effected by utilizing, for the said locking part, the existing "B" locking mechanism of the camera.

In the embodiment of the invention illustrated in FIGS. 7 and 8 the locking part which keeps the shutter in its cocked position is constituted as a two-armed lever 54 which is carried by a spindle 53. One arm 54b of the lever 54 is maintained, under the action of a spring 55, in engagement with a pin 56 which is carried by the shutter release lever 57 of the camera. The other arm 54a of the locking lever 54 has a bent lug 54c engageable with a projection 4b provided on the cocking and driving disk 4, the organization being such that for the cocking position of the disk 4 the lug 54c drops behind the projection 4b and holds the disk 4 in its cocking position. The shutter release lever 57 is also provided with two arms. The lever 57 is biased in a clockwise direction by a spring 59 arranged about the supporting spindle 58 for the lever. One arm 57a of the release lever 57 is constituted as a manually engageable handle, extending through an opening in the side wall of the shutter housing as seen in FIG. 7.

In the illustrated embodiment of FIGS. 7 and 8 the locking means which arrests and holds the released shutter in its open position comprises a two-armed lever 60 which is carried in the shutter housing by a spindle 61 and is biased in a clockwise direction by a spring 62. One arm 60a of the lever 60 has a locking nose or hook 60b adapted to cooperate with the projection 4b of the cocking and driving disk 4. The other arm 60c of the lever 60 engages a pin carried by the release lever 57, being held in such engagement under the action of the spring 62, as shown in FIG. 7.

When the release lever 57 is actuated, it shifts the locking lever 54 in a clockwise direction against the action of the spring 55, thereby disengaging the lug 54c from the nose 4b and releasing the locking and driving disk 4. At the same time the locking lever 60 is actuated in a clockwise direction under the action of the spring 62, causing the nose 60b of the lever to be placed in the path of movement of the projection 4b. The lever 60 functions to arrest and hold the shutter in an open position. When the disk 4 reaches a position corresponding to the open position of the shutter blades 2, the projection 4b of the disk will become engaged with the nose 60b of the lever 60, and this will arrest the shutter as it is fully open. The driving disk 4 is held in this arrested position until the operator removes the force which has actuated the release lever 57, as by removing his finger from such lever. When this is done, the locking lever 60 is again shifted counterclockwise disengaging the nose 60b thereof from the projection 4b of the driving disk 4. The above construction represents a well known locking device for effecting "B" exposures in a camera. Such locking device is rendered operative in response to proper adjustment of a setting member (which is not shown herein for purposes of clarity of illustration), said member being positionable in either of two settings, one such setting being indicated by the letter "B." The setting member may be constituted as a lever.

In accordance with the present invention, for the purpose of releasably moving the locking lever 60 in response to the travel of the movable coil 13 and pointer 15a of the first electromagnetic system 11a, the said lever is connected with the movable part or armature of the said electromagnetic system 20b. Such connection, as illustrated in FIG. 7, may be constituted as a thin tie rod or string 64 attached at one end to the arm 60c of the locking lever 60 and also at the other end of the armature 65 of the second electromagnetic system 20b. The said armature 65 may be constituted as a one-armed lever, as shown, said lever being influenced by a spring 66 and biased counterclockwise or toward the magnetic coil 27b.

For the purpose of actuating the contact switch which controls the first electromagnetic system 11a, in the illustrated embodiment of FIGS. 7 and 8, a part of the shutter drive mechanism is utilized, preferably that part which cooperates with the locking lever 60, as for example the cocking and driving disk 4.

The contact switch may be constituted of two springs 67 and 68 fixedly mounted in the shutter housing and insulated from each other. The springs 67 and 68 may be provided with contact rivets 69 and 70 adapted to engage each other. The said contact switch is hereinafter in the claims specifically termed an "electrical switch," and is normally open when the shutter is cocked, and for this purpose the spring 67 may have its one extremity bent, as illustrated at 4c, for engagement with the disk 4.

To correlate the closing of the contact switch 69, 70 with the start of the opening movement of the shutter blades, there is provided between the driving and cocking disk 4 and the remainder of the shutter drive mechanism a lost-motion driving connection. This lost-motion driving connection may be obtained by providing a separate disk 73 for connection with the driving latch 6 which drives the shutter blade ring 3, said separate disk 73 being coaxial with respect to the cocking and driving disk 4. The disk 73 is coupled to the driving disk 4 by a pin-and-slot connection 4d, 74. Thus, after the disk 4 has been released for movement, it turns clockwise a small distance, depending on the length of the slot 4d thereof, before it engages and drives the pin 74 and the disk 73 carrying the said pin, to effect the opening movement of the shutter.

By the provision of the said lost-motion driving connection between the part of the shutter drive mechanism which actuates the contact switch for the first electromagnetic system 11a and the remaining portion of the shutter drive mechanism there is correlated in an advantageous manner the energization of the first electromagnetic system 11a and the movement of the coil 13 and pointer 15a thereof with the start of the opening movement of the shutter blades. For, with such organization the movable part or pointer 15a of the first electromagnetic system 11a may be started on its path of travel ahead of time, whereupon it will be required to traverse only the succeeding portion of its path before the shutter blades are fully opened. This is accomplished by virtue of the delay which is effected in opening the blades because of the lost-motion driving connection. Such organization is of the greatest importance in obtaining fast shutter speeds and extra fast shutter speeds, in a camera.

In summarizing, the manner of operation of the device illustrated in FIGS. 7 and 8 for carrying out the method and procedure as provided by the invention, is as follows:

The "B" setting member of the camera is moved from the position "B" to a position indicated as "automatic," and in so doing it closes a contact switch 80 (FIG. 7) which is included in the circuit of the second electromagnetic system 20b, such switch 80 being normally open when the setting member is on the "B" setting. Upon the shutter release lever 57 being now actuated, the locking lever 60 is shifted from the position shown in FIG. 7 in a clockwise direction to a locking position in the same manner obtained with "B" exposures, under the action of the spring 62. When the locking lever 60 is in such shifted position its nose 60b is disposed in the path of movement of the projection 4b of the cocking and driving disk 4. The locking lever 60 will reach such arresting position before the locking lever 54 releases the locked, driving disk 4. With such movement of the locking lever 60 there is an accompanying movement of the lever or armature 65 of the magnetic coil 27b of the second magnetic system 20b, by virtue of the string connection 64 between the locking lever 60 and the armature 65. The armature 65 is thus shifted clockwise or in a direction away from the core of the magnetic coil 27b.

After the disk 4 has been released by actuation of the locking lever 54 it removes its influence from the switch arm 67 while taking up the lost motion of the pin-and-slot connection 4d, 74. In consequence, the contact 69 of the switch arm 67 is allowed to engage the contact 70 of the switch arm 67 is allowed to engage the contact 70 of the switch arm 68. This closes the circuit through the switch and results in energization of the first electromagnetic system 11a, causing a movement of the coil 13 and pointer 15a in a clockwise direction.

After the driving disk 4 has taken up the lost motion of the driving connection as determined by the length of the slot 4d in the disk, it engages and drives the pin 74 and the disk 73, causing the latter to actuate the latch 6 and to open the shutter blades. Prior to such opening of the blades, however, the first electromagnetic system has been energized and the coil 13 and pointer 15a thereof have traversed a portion of the total path of travel. After the driving disk 4 has reached a position corresponding to the opening of the shutter, it is held in such position by engagement between the projection 4b of the disk and the nose 60b of the locking lever 60.

The arrest of the shutter in its open position continues until the pointer 15a and movable coil 13 have completed their travel whereby the contact 40 on the pointer 15a is brought into engagement with the fixed contact 38. Such engagement effects an energization of the magnetic coil 27b of the second electromagnetic system 20b, whereupon the armature 65 is now attracted. This causes a corresponding counterclockwise moving of the locking lever 60, through the string connection 64, thereby releasing the driving disk 4 and enabling the latter to now complete its movement, closing the shutter of the camera.

In the above mentioned embodiments of the invention, the locking part which functions to hold the shutter in its arrested open position is indirectly actuated by the first electromagnetic system; since such system operates on very low power it is utilized as a control for a second electromagnetic system of more powerful nature, energized from a separate power source, which second system effects the release of the locking part.

In another way the said locking part could be released directly by a mechanical connection of the movable part of the first electromagnetic system as the latter attains the end of its path of movement. This would necessitate, however, a path of movement for the said movable part of a suitable size such that the release of the locking part which arrests the shutter may be effected. Such condition may be fulfilled either by applying suitable mechanical transmissions between the said movable and locking parts, or by interposition of an electric (especially an electronic) amplifier between the photo element and the first electromagnetic system. It is not the task of the present invention to describe the construction of such an amplifier, and for such reason no further reference will be made to it herein.

In the case of a direct mechanical operation of the locking part of the shutter arresting means by the movable part of the first electromagnetic system, the latter may be preferably provided as a rotary solenoid or solenoid having translational movement, or the like.

In the various illustrated embodiments of the invention the diaphragm aperture which is to be adjusted at the camera in connection with the regulation of the shutter speed has been simply considered merely as a device disposed in front of the photoelement 9. For changing the size of the opening through which light must come in striking the said element, such adjustment device is constituted as a diaphragm 75, which may be actuated by means of a ring 76.

To avoid a separate setting of the diaphragm 75 which is coordinated with the photoelement 9, the said diaphragm is coupled in a well known manner with the setting member 78 for the lens diaphragm 77. As illustrated herein, this coupling is effected by providing on the setting rings 76 and 78 external gear teeth adapted to mesh with each other. In addition to the correlation between the lens diaphragm and the shutter speed, other exposure factors may be taken into consideration by relative displacement of the two diaphragm setting devices 76 and 78. For example, film sensitivity factors and filter factors may be accounted for. Such relative displacement between the setting members 76 and 78 may be accomplished as follows: The setting rings for the two diaphragms may be uncoupled from each other and the setting ring 76 may be made adjustable with respect to a film sensitivity scale or a filter scale.

Instead of employing a diaphragm type device for changing the size of the opening for the light which is to strike the photoelement 9, or in addition to such diaphragm device, there may be further provided a means for changing the illumination power of the photoelement itself. For example, a wedge of grey glass may be provided, to be moved in front of the photoelement 9.

By virtue of the above described embodiments of the invention, by which the method and procedure provided by the invention may be carried out, it will be understood that there is created an advantageous, relatively inexpensive automatic regulation or setting means for shutter speeds, which means is reliable in its operation. The timing of the exposure, as provided by the procedure in accordance with the present invention, depends exclusively on the time that is required for the movable part of the first electromagnetic system to traverse a predetermined path, said time being a function of the magnitude of the energizing current which makes the said electromagnetic system operative. Such energizing current is provided by the photoelectric element and is in turn a function of the light which is permitted to strike and activate the element. Since, as mentioned above, this timing is determined by the laws of the ballistic principle, there is obtained the greatest accuracy and uniformity of operation, these being inherent in the devices and the method provided by the invention. Also, from a consideration of the illustrated embodiments of the invention it will be understood that for carrying out the procedure and method as provided by the invention advantageous devices of different kinds may be employed and applied. All such devices would have in common an operation wherein the shutter, upon being allowed to open and being arrested in its open position, is released for closing after an interval of time determined by the travel of a movable part of the first electromagnetic system over a predetermined path of travel. Such time required by the movable part is a function of the magnitude of the current which energizes the said system, and such current is in turn a function of the light which is permitted to strike the photoelectric element scanning the subject to be photographed. It will be understood that the procedure as provided by the invention has great utility in connection with all kinds of photographic picture-taking devices, because inherent in the exposure operation of all well-known cameras there is a phase which the camera shutter passes through wherein it completely and fully opens the light admitting aperture for the film. Accordingly, it is readily seen that the methods and devices of the invention have utility for both cameras with intra-lens shutters and cameras with focal-plane shutters. In the case of cameras having focal-plane shutters the procedure in accordance with the invention may be readily carried out by the provision of a second curtain which is released in response to timing effected by the movable part of the first electromagnetic system. With such arrangement, where fast shutter speeds are involved, the second curtain would be released not only after the exposure aperture is open but after the elapse of a greater or lesser time from the instant the first curtain has started to move. Thus, in a well-known manner, the two curtains may form an exposure slot of greater or less breadth.

I claim:

1. The method of regulating the speed of the shutter in a photographic camera, which includes the steps of opening the shutter and simultaneously energizing an electromagnetic system with a photocell current having a magnitude determined by the intensity of the illumination of said cell, and closing the said shutter in response to a movable part of said electromagnetic system travelling a predetermined distance in a time which is a function of the magnitude of the said current.

2. In a photographic camera, a shutter; a drive mechanism for actuating the shutter and locking means for holding the drive mechanism cocked, said mechanism including projecting stop means by which it may be held immovable; locking means engageable with said stop means for halting the drive mechanism with the shutter open; spring means biasing said second-named locking means to operative position; a photoelectric element; an electromagnetic system adapted to be energized by said element with a current which varies in magnitude as determined by the intensity of illumination of said element, said system having a movable part driven in response to said energization by the said current; means for releasing the said first-mentioned locking means and also effecting said energization of the electromagnetic system by the photoelectric-element; and means for automatically releasing said second-mentioned locking means in response to said movable part reaching the end of its movement in a time which is a function of the magnitude of said current.

3. The invention as defined in claim 2 in which the means for releasing the second-mentioned locking means includes a second electromagnetic system having a powered member connected with said locking means, includes a separate power source, and includes a contact switch in said system, actuated by the said movable part.

4. The invention as defined in claim 3, in which there is a shutter release, in which the first-mentioned locking means is adapted to hold the shutter in cocked position, in which there is spring biased means acting on the first-mentioned locking means, said means being cooperable with the stop means of the drive mechanism, and in which there is a third electromagnetic system connected to the said separate power source for energization thereby and having a powered member for actuating said first-mentioned locking means and further having a switch means actuated by the said shutter release.

5. The invention as defined in claim 3 in which there is a shutter release, in which the first-mentioned locking means is adapted to hold the shutter in cocked position, in which there is spring biased means acting on the first-mentioned locking means, said locking means being cooperable with the stop means of the drive mechanism and being actuated by the powered member of the second electromagnetic system, said second system having switch means controlling it and actuated by the said shutter release.

6. The invention as defined in claim 4 in which the said locking means are constituted in the form of latches on the said powered members.

7. The invention as defined in claim 4, in which the third electromagnetic system has an additional switch means and the second electromagnetic system has an additional switch means, both said means being controlled by the said movable part of the first-mentioned electromagnetic system, said additional switch means of the third system being closed when the said first-mentioned system is de-energized and being opened when the first-mentioned system is energized, said additional switch means of the second system being closed when the said movable part reaches the said end of its movement.

8. The invention as defined in claim 5, in which the second electromagnetic system has two additional switch means controlled by the said movable part of the first-mentioned electromagnetic system, one of said additional switch means being closed when the said first-mentioned system is de-energized and being opened when the system is energized, and the other additional switch means being closed when the said movable part reaches the said end of tis movement.

9. The invention as defined in claim 8, in which the said powered member comprises a spring-charged lever which constitutes both the first-mentioned and second-mentioned locking means, and in which the shutter-drive mechanism has two different parts cooperable with the said lever whereby the latter both holds the drive mechanism cocked and holds the shutter in open position.

10. The invention as defined in claim 5 in which there is a shunt adapted for connection in parallel with the said second electromagnetic system, said contact switch when actuated by the movable part reaching the end of its movement closing and completing the said parallel connection thereby to reduce the current through the second electromagnetic system to render the same inoperative.

11. The invention as defined in claim 10 in which the said powered member comprises a lever part which is included in both the first-mentioned and second-mentioned locking means, said lever part cooperating with one and the same reciprocatively-movable part of the shutter drive mechanism, one of said parts having a spring-loaded latch and the other part having a shoulder cooperable with the latch, said latch being effective to halt said other part only during relative one-way movement of the parts.

12. The invention as defined in claim 4 in which there is an on-off switch in the circuit of the first-mentioned electromagnetic system, said on-off switch being actuated simultaneously with the said switch means actuated by the shutter release.

13. The invention as defined in claim 3 in which there is a shutter release, in which the locking means for the drive mechanism comprises a spring-charged lever mechanically connected with the shutter release and cooperable with the said stop means, said lever being arranged to hold the shutter drive mechanism cocked, in which the means for effecting energization of the first-mentioned electromagnetic system includes an electrical switch in the circuit of the said first-mentioned electromagnetic system and means for closing the electrical switch when the drive mechanism has left its starting position, said electrical switch being open for such starting position, in which the means for automatically releasing the second-mentioned locking means includes a contact switch which is closed as the movable part reaches the end of its movement.

14. The invention as defined in claim 13 in which a part of the shutter drive mechanism is arranged for cooperation with the said spring-charged lever, said part actuating the said electrical switch, and in which there is a lost-motion driving connection between said part and the remainder of the shutter drive mechanism.

15. The invention as defined in claim 13 in which the said first-mentioned and second-mentioned electromagnetic systems have a common supply lead, and in which the said electrical switch is disposed in the said lead.

16. The invention as defined in claim 2 in which the means for automatically releasing the second-mentioned locking means includes a switch means mechanically actuated by the said movable part, said electromagnetic system including a magnet having a turnable armature constituting the said movable part.

17. The invention as defined in claim 2 in which the electromagnetic system includes a moving coil measuring device having a speed scale, the said movable part constituting a pointer of said device, cooperable with said speed scale, in which the means effecting energization of the electromagnetic system includes a first switch, and in which there is a resistor and a manually-operable switch series-connected thereto, the remaining ends of said resistor and manually-operable switch being connected with the terminals of the said first switch.

18. The invention as defined in claim 2 in which the locking means for halting the drive mechanism and the stop means cooperable therewith constitute the "B" lock of the camera.

19. The invention as defined in claim 2 in which there are means disposed in front of the photo-electric element, for varying the light admitted to the element, thereby to enable other exposure factors to be taken into consideration.

20. In a photographic camera, a releasable shutter; a releasable stop mechanism for halting the released shutter in open condition; a photoelectric element responsive to existing light conditions; an electromagnetic control system for energization by said element and adapted when energized to actuate the stop mechanism and render the same inoperative, thereby to enable the shutter to close; means for releasing the shutter for opening movement and for energizing the control system from the photoelectric element, said system having a time lag varying with the magnitude of its energization, thereby to effect a timed exposure by the shutter which is controlled by existing light conditions.

References Cited in the file of this patent
UNITED STATES PATENTS

| | | |
|---|---|---|
| 1,813,635 | Myers | July 7, 1931 |
| 1,974,433 | Riszdorfer | Sept. 25, 1934 |
| 2,059,032 | Riszdorfer | Oct. 27, 1936 |
| 2,179,717 | Fedotoff | Nov. 14, 1939 |
| 2,179,718 | Fedotoff | Nov. 14, 1939 |
| 2,187,953 | Schmidt | Jan. 23, 1940 |
| 2,226,602 | Frost | Dec. 31, 1940 |
| 2,418,370 | Simmon | Apr. 1, 1947 |
| 2,477,235 | Broido | July 26, 1949 |
| 2,577,774 | Lee | Dec. 11, 1951 |
| 2,780,971 | Fahlenberg | Feb. 12, 1957 |
| 2,800,844 | Durst et al. | July 30, 1957 |
| 2,887,025 | Rentschler | May 19, 1959 |